United States Patent
Hsieh et al.

(10) Patent No.: US 8,792,362 B2
(45) Date of Patent: Jul. 29, 2014

(54) LOOP DETECTION METHOD AND NETWORK DEVICE APPLYING THE SAME

(75) Inventors: Yao-Yu Hsieh, Yangmei Township, Taoyuan County (TW); Jung-You Feng, Hsinchu (TW); Mu-Jung Hsu, Zhonghe (TW)

(73) Assignee: Realtek Semiconductor Corp., Hsinchu (TW)

( * ) Notice: Subject to any disclaimer, the term of this patent is extended or adjusted under 35 U.S.C. 154(b) by 365 days.

(21) Appl. No.: 12/959,009

(22) Filed: Dec. 2, 2010

(65) Prior Publication Data

US 2011/0128863 A1 Jun. 2, 2011

(30) Foreign Application Priority Data

Dec. 2, 2009 (TW) ................................ 98141262 A

(51) Int. Cl.
| H04L 1/00 | (2006.01) |
|---|---|
| H04L 12/28 | (2006.01) |
| H04L 12/56 | (2006.01) |
| H04L 12/46 | (2006.01) |
| H04L 12/26 | (2006.01) |
| H04L 12/24 | (2006.01) |

(52) U.S. Cl.
CPC ........... *H04L 12/4625* (2013.01); *H04L 43/106* (2013.01); *H04L 49/555* (2013.01); *H04L 41/0604* (2013.01); *H04L 45/18* (2013.01)
USPC ............................ 370/249; 370/389; 370/392

(58) Field of Classification Search
None
See application file for complete search history.

(56) References Cited

U.S. PATENT DOCUMENTS

| 6,857,027 | B1 | 2/2005 | Lindeborg et al. | |
|---|---|---|---|---|
| 2005/0063311 | A1* | 3/2005 | Sekiguchi | 370/241 |
| 2005/0076140 | A1 | 4/2005 | Fung | |
| 2006/0007869 | A1* | 1/2006 | Hirota et al. | 370/244 |
| 2006/0126517 | A1 | 6/2006 | Kurosaki et al. | |
| 2006/0285499 | A1* | 12/2006 | Tzeng | 370/249 |
| 2007/0115838 | A1* | 5/2007 | Dunbar | 370/249 |
| 2007/0118595 | A1* | 5/2007 | Jain et al. | 709/203 |

(Continued)

FOREIGN PATENT DOCUMENTS

| CN | 101005412 A | 7/2007 |
|---|---|---|
| CN | 101197648 A | 6/2008 |
| CN | 101316197 A | 12/2008 |

OTHER PUBLICATIONS

"IEEE Standard for Local and Metropolitan Area Networks: Media Access Control (MAC) Bridges"; Institute of Electrical and Electronics Engineers, Inc.; IEEE STD 802.1 D; Jun. 9, 2004.

*Primary Examiner* — Kevin C Harper
*Assistant Examiner* — Peter Chen
(74) *Attorney, Agent, or Firm* — McClure, Qualey & Rodack, LLP

(57) ABSTRACT

A network device including an address move detection unit, a loop detection packet generation unit, a packet parser unit and a loop determination unit coupled to the packet parser unit is provided. The address move detection unit detects whether an address field of a first packet received by the network device is moved. The loop detection packet generation unit generates a loop detection packet if the address move detection unit detects that the address field is moved. The packet parser unit parses a second packet received by the network device to extract an information. Based on the information, the loop determination unit determines whether the second packet matches the loop detection packet so as to determine whether there is any loop existing in the network device.

21 Claims, 3 Drawing Sheets

(56) References Cited

U.S. PATENT DOCUMENTS

| | | | |
|---|---|---|---|
| 2007/0121518 A1* | 5/2007 | Arunachalam et al. | 370/249 |
| 2007/0253346 A1* | 11/2007 | Nguyen et al. | 370/256 |
| 2008/0275999 A1* | 11/2008 | Yanagihara | 709/232 |
| 2009/0028180 A1* | 1/2009 | Strater et al. | 370/465 |
| 2010/0054133 A1* | 3/2010 | Schuringa et al. | 370/241 |

* cited by examiner

LOOP DETECTION METHOD AND NETWORK DEVICE APPLYING THE SAME

This application claims the benefit of Taiwan application Serial No. 98141262, filed Dec. 2, 2009, the subject matter of which is incorporated herein by reference.

BACKGROUND OF THE INVENTION

1. Field of the Invention

The invention relates in general to a loop detection method and a network device applying the same, in which the determination of the existence of the loop is based on whether the source address moves.

2. Description of the Related Art

Ethernet network, the most commonly used local area network (LAN), is used for linking personal computer (PC) to a local area network (LAN). In the Ethernet network, data is transmitted in packet. The switch is the most commonly used bridge in the local area network and there are other bridges such as router.

A switch has many ports linked to a PC, a notebook computer or other bridges. After one port of the switch receives a packet, the switch selects appropriate destination port according to the destination address of the packet and then transmits the packet to the destination port.

Low-level switch, usually not supporting the network management function, does not always have a central processing unit (CPU) for computation. If the low-level switch is not equipped with CPU, the packet is processed by an application specified integrated circuit (ASIC) without computation ability. Therefore, the low-level switch, though having the advantage of low cost, is not adapted to complicated communication protocols.

Broadcast is a transmission method for Ethernet network. A packet with a specific destination address is regarded as a broadcast packet. When the switch receives the broadcast packet, the switch transmits the broadcast packet to each port. In a large-scaled local area network, the loop may be formed between two or more bridges and there may have more than two paths existing in the loop. The broadcast packet may be repeatedly transmitted or forwarded within the loop, not only occupying the bandwidth of the network and consuming the resources of the network device but also deteriorating the efficiency of the network.

In detail, when a loop occurs in the network, the packet will be endlessly transmitted within the loop, greatly deteriorating transmission efficiency. The packet occupies a fixed memory space in a switch. Under normal circumstance, after a packet is transmitted, the switch can release the memory space occupied by the packet. However, with the existence of the loop, after a broadcast packet is transmitted, the switch may immediately receive the broadcast packet which has just been transmitted, and further store the broadcast packet in the memory and waste memory space. If there is a large number of broadcast packets in the loop, all the available memory space in the switch will almost be used up, leading to packet loss (data loss) or even causing the network to shut down.

Referring to FIG. 1A and FIG. 1B, two kinds of loops formed in LAN are respectively shown. In FIG. 1A, the PCs 105 and 115 transmit packets to each other through the switches 110 and 120. As indicated in FIG. 1A, the packets transmitted from the switch 110 may be sent back by the switch 130, hence forming a loop.

In FIG. 1B, the PCs 105 and 115 transmit packets to each other through the switches 110, 120 and 130. As indicated in FIG. 1B, the packet transmitted from the switch 110 may be sent back by the switches 130 and 140, hence forming a loop. The loop illustrated in FIG. 1B is referred as self-loop as for the switch 110.

Currently, several technologies are already provided to resolve problems caused by the loop. In a first technology, conformed to IEEE 802.1 spanning tree protocol, according to the spanning tree protocol, when a loop occurs, some links on the loop will be cut off (for example, a link is broken by disabling port(s) of the switch), so as to break the loop. However, it is more costive to support the spanning tree protocol by hardware. If the spanning tree protocol is supported by software, then the switch needs to have a CPU. But low-level switch does not always have a CPU, the spanning tree protocol is not very adaptable to the low-level switch.

The second technology is achieved by simplifying the spanning tree protocol for low cost. The second technology also breaks a loop by disabling port(s) of the switch. However, after a loop is broken, the second technology is unable to restore (i.e. enable) the disabled ports. This will lead to a cut-off of LAN and incapacitates packet transmission.

Embodiments of the invention provide a low-cost loop detection method, adaptable to low-level, middle-level or high-level network device.

SUMMARY OF THE INVENTION

Embodiments of the invention are directed to a low-cost loop detection method and a network device applying the same. If the source address moves (i.e. changes), whether the loop detection packet transmitted by the network device itself is received is determined so to determine whether there is any loop existing in the network device.

Embodiments of the invention are directed to a low-cost loop detection method and a network device applying the same. During checking the loop detection packet, an identification (ID) code is generated randomly. User does not have to manually designate an ID code, hence reducing the inconvenience for the manufacturers or the network managers.

Embodiments of the invention are directed to a low-cost loop detection method and a network device applying the same. When the loop occurs, the network device can warn the user by specific warning. The network device lifts the loop warning state after the loop disappears.

According to a first example of the present invention, a network device including an address change detection unit, a loop detection packet generation unit, a packet parser unit, and a loop determination unit coupled to the packet parser unit is provided. The address change detection unit detects whether an address field of a first packet received by the network device is changed. The loop detection packet generation unit generates a loop detection packet when the address change detection unit detects that the address field is changed. The packet parser unit parses a second packet received by the network device to extract an information. On the basis of the information, the loop determination unit determines whether the second packet is the loop detection packet so as to determine whether there is any loop existing in the network device.

According to a second example of the present invention, a loop detection method of a network device is provided. The loop detection method includes the following steps. Whether an address field of a first packet received by the network device is changed is determined. A loop detection packet is generated when it is detected that the address field is changed. A second packet received by the network device is parsed to extract an information. On the basis of the information, whether the second packet is the loop detection packet is determined so as to determine whether there is any loop existing in the network device.

The invention will become apparent from the following detailed description of the preferred but non-limiting embodiments. The following description is made with reference to the accompanying drawings.

DETAILED DESCRIPTION OF THE INVENTION

Figure 2:
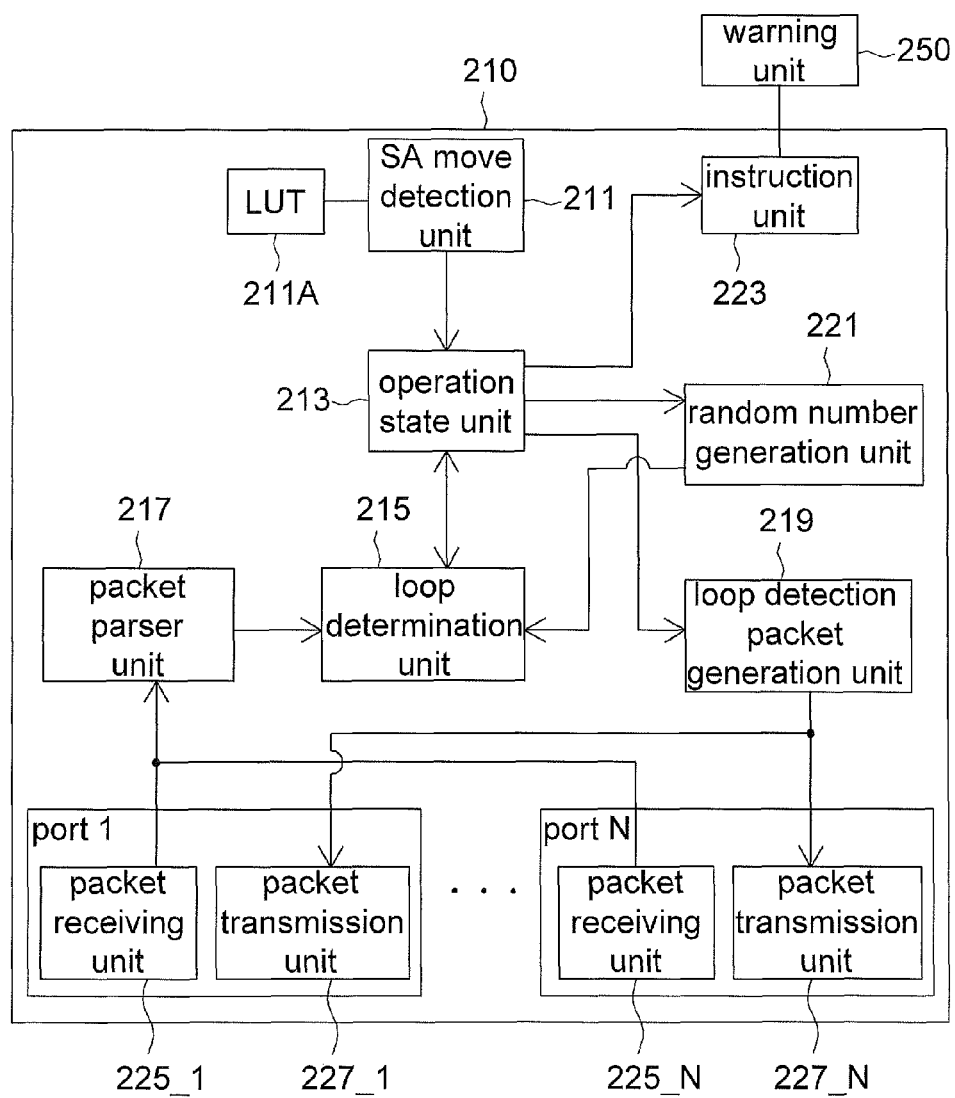
FIG. 2 shows a functional block diagram of a network device according to an embodiment of the invention.

FIG. 2 shows a functional block diagram of a network device 200 according to an embodiment of the invention. Examples of the network device include bridges such as wire/wireless switch, router, access point and etc. As indicated in FIG. 2, the network device 200 at least includes a loop detection module 210 and a warning unit 250. The loop detection module 210 at least includes a source address move detection unit 211, a look-up table (LUT) 211A, an operation state unit 213, a loop determination unit 215, a packet parser unit 217, a loop detection packet generation unit 219, a random number generation unit 221, an instruction unit 223, a number of packet receiving units 225_1~225_N and a number of packet transmission units 227_1~227_N.

If the loop detection module 210 is implemented by hardware, it can be disposed on a medium access control (MAC) layer. Besides, if the network device has a CPU with computation ability, then functions of the source address move detection unit 211, the operation state unit 213, the loop determination unit 215, the packet parser unit 217, the loop detection packet generation unit 219 and the random number generation unit 221 can be implemented by software. In other words, these units 213, 215, 217 and 221 can be executed by the CPU.

Figure 1A:
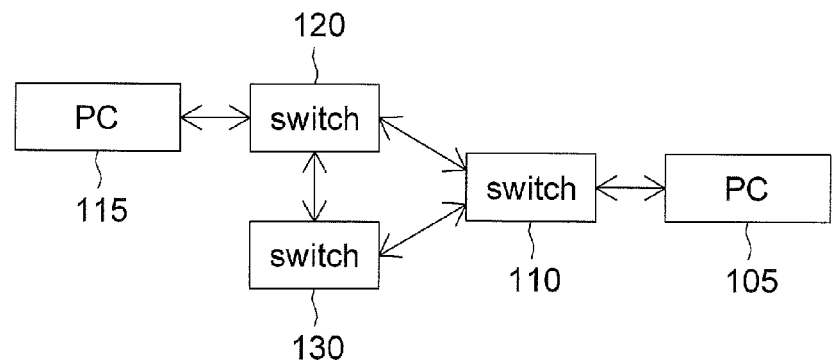
FIG. 1A and FIG. 1B respectively show two kinds of loops formed in a local area network.

The network packet at least includes a source address (SA) and a destination address (DA). The look-up table 211A records the correspondence relation between the source address and the source port, wherein the source port refers to the packet receiving port of the network device. Let FIG. 1A be taken for example. If the source address of the packet transmitted to the switch 110 from the PC 105 is SA1 and the PC 105 is linked to the port 1 of the switch 110, then the look-up table 211A records the correspondence relation between SA1 and the port 1. That is, under normal circumstance (no loop occurs), the packets with the source address SA1, which should be transmitted from the PC 110, should be received through the port 1.

However, there are at least two scenarios making the correspondence relation between the SA and the source port changes (that is, the correspondence relation is different from that illustrated in the look-up table 211A). The first scenario occurs when the user links the PC 105 to another port of the network device (but maybe no loop exists). The second scenario occurs when the loop exists. When the correspondence relation between the SA and the source port changes, the network device of the present embodiment of the invention confirms whether the scenario is the first scenario or the second scenario. If the first scenario occurs, then the network device does not warn the user. If the second scenario occurs, then the network device informs the user of abnormality for reminding the user to eliminate the loop. After the loop is eliminated, the warning state of the network device disappears automatically without any manual operation.

The source address move detection unit 211 continually detects the correspondence relation between the SA of the received packets and the source port, and further compares to the look-up table 211A to determine whether the SA of the packet received by the network device moves. If the correspondence relation between the SA of the packet and the source port is different from that in the look-up table 211A, then it is determined that a source address move event occurs and the source address move detection unit 211 must inform the operation state unit 213 to check whether there is any loop existing.

Figure 3:
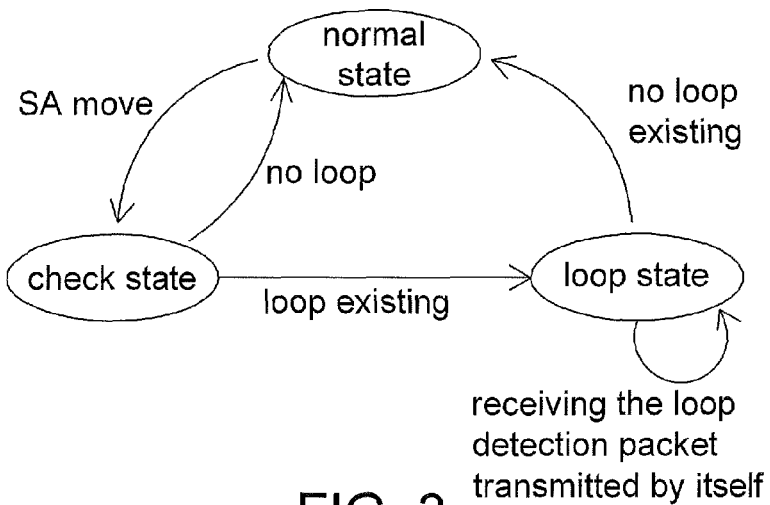
FIG. 3 shows the state of an operation state unit of the network device according to the embodiment of the invention.

The operation state unit 213 is a state machine which records the current operation state of the network device. The operation state includes at least a normal state, a check state and a loop state. FIG. 3 shows the state of the operation state unit 213 of the network device according to the embodiment of the invention. As indicated in FIG. 3, initially, the operation state unit 213 is in the normal state, which denotes that there is no SA (source address) move event and no loop. If loop determination unit 215 determines that there is a loop existing, the loop determination unit 215 informs the operation state unit 213 to change its state into the loop state.

If the user links PC to another port of the network device, the SA is moved (but no loop exists). The operation state unit 213 enters into the check state if informed by the source address move detection unit 211 that the SA moves.

In the check state, the network device of the present embodiment of the invention checks each port to confirm whether there is any loop existing. Check of the existence of the loop is disclosed below. If the loop exists on at least one port, then the operation state unit 213 enters the loop state. If no loop occurs at any of the ports, then the operation state unit 213 returns to the normal state.

In the loop state, the network device 200 checks whether there is any loop existing. If the loop exists, then the network device 200 will inform the user about the existence of the loop. If none of the ports reports the existence of the loop, then the operation state unit 213 returns to the normal state from the loop state. If at least one port continually reports the existence of the loop, then the operation state unit 213 remains at the loop state.

Figure 4:
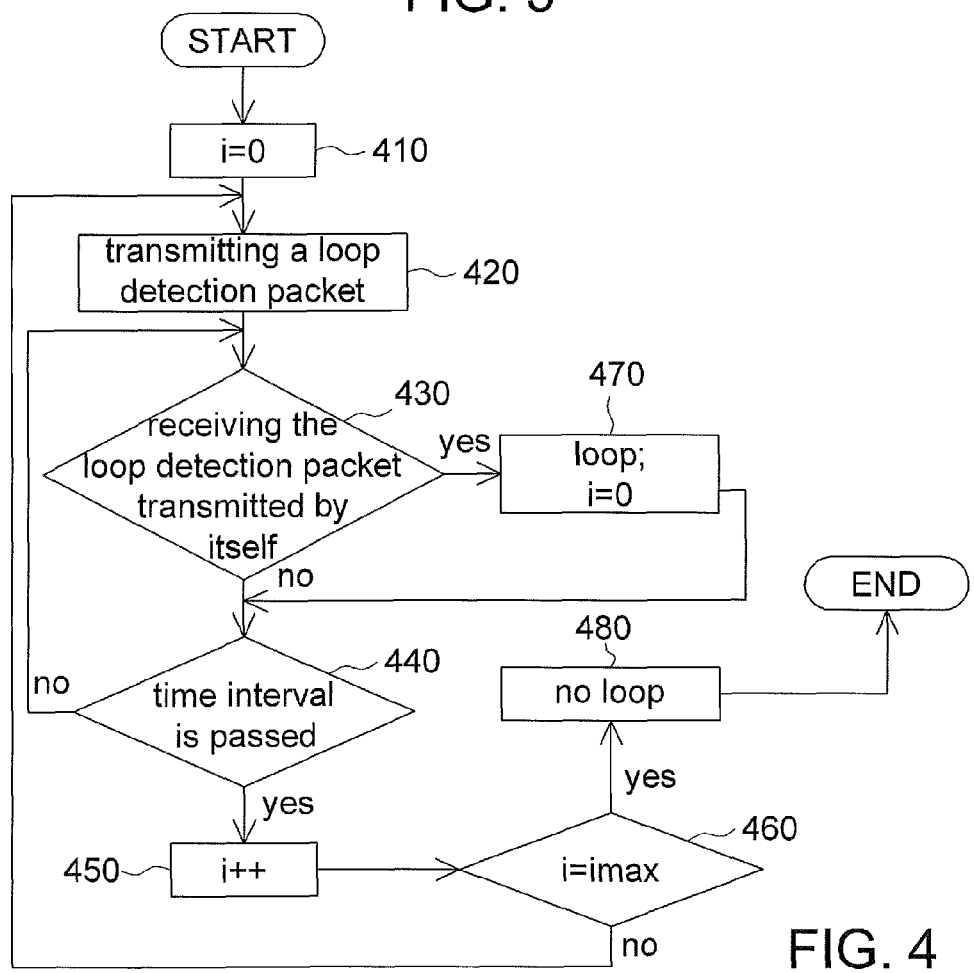
FIG. 4 shows a flowchart of confirming whether a loop occurs according to the embodiment of the invention.

Referring to FIG. 4, a flowchart of confirming the existence of the loop by the network device according to the embodiment of the invention is shown. When the operation state unit 213 is in the check state or the loop state, the steps illustrated in FIG. 4 will be performed.

At step 410, the initial value of the parameter i is set. The parameter i denotes times of transmitting the loop detection packet. At step 420, the network device 200 transmits a loop detection packet to other network devices in the local area network.

At step 430, the network device 200 determines whether the loop detection packet transmitted by itself is received. How to determine whether the loop detection packet is transmitted by itself is disclosed below. If the network device 200 receives the loop detection packet transmitted by the network device 200 itself (suppose the loop detection packet is received at port a), then the network device 200 reports that there is a loop existing on the port a as indicated in step 470.

Then, the operation state unit 213 enters the loop state from the check state, or, the operation state unit 213 remains at the loop state.

In the present embodiment of the invention, the next loop detection packet is transmitted after a time interval is passed. In step 440, whether the time interval is passed is determined. If the time interval is passed, then at step 450, the parameter i is added for example by 1 (because the next loop detection packet is transmitted). Otherwise, the method returns to step 430 to determine whether the loop detection packet transmitted by the network device 200 itself is received.

After step 450, as shown in step 460, whether the parameter i reaches a maximum value ($i_{max}$) is determined. If the parameter i reaches the maximum value, this implies that after the loop detection packet is transmitted for a predetermined times ($i_{max}$), the network device does not receive any loop detection packet transmitted by the network device 200 itself, and it can be concluded that there is no loop existing in the network device (that is, the source address move event may arise because the user links the PC 105 to another port of the network device). Then, the method proceeds to step 480 and the report indicates no loop status.

On the other hand, if the parameter i has not reached the maximum value yet, then the method returns to step 420 to determine whether the loop detection packet transmitted by the network device 200 itself is received.

In the check state or the loop state, if no loop detection packet transmitted by local (i.e. by itself) is received after the loop detection packet is transmitted for the predetermined times, this implies that there is no loop existing, and the operation state unit 213 returns to the normal state. To the contrary, if at least one loop detection packet transmitted by local is received before i reaches $i_{max}$, this implies that there is a loop existing, and the operation state unit 213 enters the loop state from the check state or remains at the loop state. In the loop state, under the control of the instruction unit 223, the warning unit 250 of the network device 200 emits a warning signal (such as a buzzing sound emitted by the buzzer or a specific LED flashing) to inform the user about the current existence of the loop. Alternatively, the instruction unit 223 sends an interrupt signal to the CPU to inform the CPU about the current existence of the loop.

In the loop state, the network device executes the steps illustrated in FIG. 4 to check whether the loop is lifted. If the loop is lifted already, then the operation state unit 213 returns to the normal state. If the loop is not lifted yet, then the operation state unit 213 remains at the loop state. In FIG. 4, both the time interval and $i_{max}$ (the maximum number of times of transmitting the packet) can be changed or set by the user.

In the check state or the loop state, the network device 200 transmits a loop detection packet. The loop determination unit 215 determines whether there is any loop existing. In greater details, the loop determination unit 215 determines whether there is any loop existing by identifying whether the received loop detection packet is transmitted by local (i.e. by the network device 200 itself). If the received loop detection packet is transmitted by local, then it is concluded that there is a loop existing and the existence of the loop must be reported (and it also records the port receiving the loop detection packet as well as the port transmitting the loop detection packet). On the other hand, if the received loop detection packet is not transmitted by local, then the loop determination unit 215 transmits the received loop detection packet to a port mask designated by the user.

When the operation state unit 213 receives the SA move event, the operation state unit 213 informs the loop detection packet generation unit 219 to generate a loop detection packet. In the present embodiment of the invention, the loop detection packet includes (a) a destination address field, (b) a source address field, (c) a type field, (d) a protocol ID field, (e) a random ID field, (f) a user-set ID field, (g) a port number field, (h) a reservation number field, and (i) an error check field.

(a) The destination address field: has a length of 6 bytes and records the destination address of the packet. If each byte in the destination address field is 0xFF, this implies that the loop detection packet is a broadcast packet. On the other hand, the user may set the destination address field to determine to which port the loop detection packet is transmitted.

(b) The source address (SA) field: has a length of 6 bytes and records the source address of the loop detection packet, wherein the format of the SA field is an MAC address.

(c) The type field: has a length of 2 bytes and denotes the type of the packet, wherein the type field is set by the manufacturer of the network device 200.

(d) The protocol ID field: has a length of 1 byte, wherein the predetermined value of the protocol ID field is 0×23. The protocol ID field is a basis in identifying whether the packet is a loop detection packet. That is, if the protocol ID field of a packet is not equal to the predetermined value, then it is concluded that the packet is not a loop detection packet, and vice versa.

(e) The random ID field: has a length of 6 bytes, and denotes the network device ID code randomly generated. Each time when the operation state unit 213 enters the check state, the random ID field is generated by the random number generation unit 221. In the check state and the loop state, the random ID code remains unchanged. Based on the random ID field, the loop determination unit 215 of the network device 200 identifies whether the loop detection packet is transmitted by the network device itself. Since the random ID field is a random number (generated by the random number generation unit 221), the random ID field of the loop detection packet generated by different network devices is usually different from each other (or, the likelihood that the random ID field of the loop detection packet generated by different network devices is the same is very low). If the random ID field of the received loop detection packet is the same as the random code, then it can be concluded that the loop detection packet is transmitted by the network device itself (that is, there is a loop existing).

(f) The user-set ID field: has a length of 6 bytes, and denotes the network device ID code set by the user. The random ID fields randomly generated by different network devices still could happen to be identical (however, the likelihood is very low). To avoid such coincidence and to determine whether the loop detection packet is transmitted by the network device itself, in the present embodiment of the invention, the user-set ID field of the received loop detection packet is further compared to the value set by the user. If the same, then it is concluded that the loop detection packet is transmitted by the network device itself.

Figure 1B:
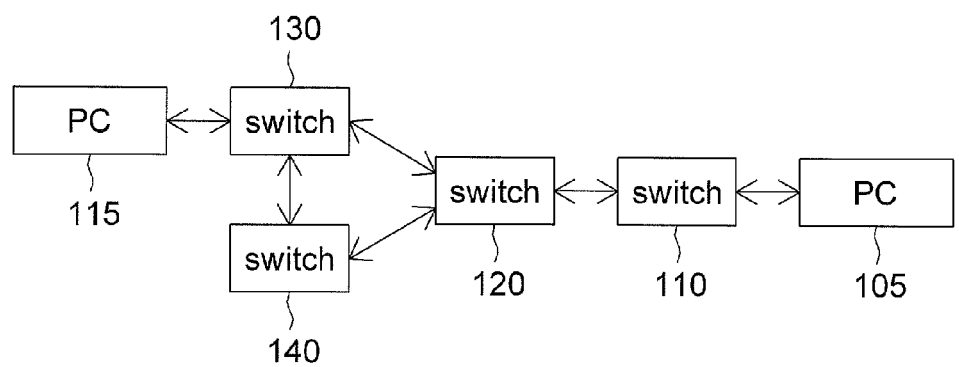

(g) The port number field: denotes the port number transmitting the loop detection packet. Let FIG. 1A be taken for example. Suppose that the port 1 of the switch 110 is linked to the switch 120 and the port 3 of the switch 110 is linked to the switch 130. If the switch 110 determines that the loop detection packet transmitted from the switch 130 is transmitted by the switch 110 itself (and the port number field of the loop detection packet is 1), this implies that there is a loop existing between the port 1 and the port 3 of the switch 110. Let FIG. 1B be taken for example. Suppose the port 1 of the switch 110 is linked to the switch 120. If the port 1 of the switch 110 determines that the loop detection packet transmitted from the switch 120 is transmitted by the switch 110 itself (and the port number field is 1), this implies that there is a self-loop excising on the port 1 of the switch 110.

(h) The reservation number field: has a length of 32 bytes, wherein the values of the 32 bytes may all be 0.

(i) The error check field: is used for checking the error of the packet.

Each time the operation state unit 213 enters the check state, the random number generation unit 221 generates a random number (whose length is 6 bytes as well). This random number is added to the loop detection packet, so that the network device identifies whether the received loop detection packet is transmitted by the network device itself. This random number remains unchanged in the check state and the loop state.

After the packet is received by the network device, the packet parser unit 217 determines whether the packet is a loop detection packet according to the protocol ID field. If yes, then the packet parser unit 217 extracts the required information (for example the random ID field and/or the user-set ID field) from the loop detection packet, and further transmits to the loop determination unit 215. The loop determination unit 215 further compares the random ID code of the network device 200 (generated by the random number generation unit 221) and the user-set ID with the random ID field and the user-set ID field extracted by the packet parser unit 217 from the loop detection packet to determine whether the received loop detection packet is transmitted by the network device itself. In determining whether the received loop detection packet is transmitted by the network device itself, the loop determination unit 215 may compare the user-set ID of the network device 200 with the user-set ID field extracted from the loop detection packet and/or compare the random ID of the network device 200 with the random ID field extracted from the loop detection packet. If the comparison matches (this implies the existence of the loop), the loop determination unit 215 informs the operation state unit 213 that there is a loop existing.

If the operation state unit 213 is in the loop state, according to the port number field of the loop detection packet and the port number of the port receiving the loop detection packet, the instruction unit 223 performs the following actions: (a) controlling light emitting diode (LED) of the network device to inform the user about the ports on which the loop occurs by flashing LEDs in a specific way, (b) triggering the buzzer to inform the user about the ports on which the loop occurs, or, (c) issuing an interrupt signal to the CPU (not illustrated in FIG. 2). The CPU performs corresponding processing on the ports on which the loop occurs because the port number of ports on which the loop occurs is/are already recorded in the register (not illustrated in FIG. 2). Each port has 2~3 LEDs for showing the packet receiving/transmitting status of the port. If the loop occurs on this port, then its LEDs is in flash.

The packet receiving units 225_1~225_N and the packet transmission units 227_1~227_N are coupled to the physical layer of the network device. The loop detection packet generated by the loop detection packet generation unit 219 is transmitted to the physical layer through the packet transmission units 227_1~227_N and then is further transmitted to other network devices. On the other hand, the packet (transmitted from other network devices) received by the physical layer is transmitted to the packet parser unit 217 through the packet receiving units 225_1~225_N. Bus between the packet receiving units 225_1~225_N and the packet parser unit 217 may be high-speed for transmitting the packet at high speed. Bus between the loop detection packet generation unit 219 and the packet transmission units 227_1~227_N may be high-speed for transmitting the packet at high speed.

How the present embodiment of the invention detects the existence of the loop is disclosed below. If the source address move detection unit 211 detects the source address move event, the source address move detection unit 211 informs the operation state unit 213 about this SA move event. In response to, the operation state unit 213 enters the check state from the normal state.

After the operation state unit 213 enters the check state, the operation state unit 213 informs the loop detection packet generation unit 219 to generate a loop detection packet. The operation state unit 213 informs the random number generation unit 221 to generate a random number which is added to the loop detection packet. The loop detection packet is then transmitted to other network devices in the same local area network through the packet transmission units 227_1~227_N. Next, if the network device 200 receives a loop detection packet transmitted from other network devices in the same local area network, the packet is then transmitted to the packet parser unit 217 through the packet receiving units 225_1~225_N. If the packet parser unit 217 parses that the format of the received packet matches the loop detection packet format, the packet parser unit 217 extracts a random ID field and a user-set ID field from the received packet and further transmits the extracted fields to the loop detection packet generation unit 219. On the basis of the received information, the loop detection packet generation unit 219 determines whether the received packet is transmitted by the network device 200 itself. If yes, then the loop detection packet generation unit 219 informs the operation state unit 213, and the operation state unit 213 enters into the loop state from the check state. On the contrary, after the network device 200 emits the loop detection packets for a predetermined number of times, if none of the ports of the network device 200 receives the loop detection packet transmitted by the network device 200 itself, then the operation state unit 213 returns to the normal state from the check state (this implies that the source address move event previously detected by the source address move detection unit 211 may arise because the user link the PC to another port of the network device 200). In the embodiment of the application, the loop detection packet is sent to the packet parser unit 217. Packet other than the loop detection packet is sent to its destination port based on the destination address in the packet and a source port mapping result via the LUT 211A.

In the loop state, the operation state unit 213 performs the steps illustrated in FIG. 4. The network device 200 still transmits the loop detection packet to other network devices. After the operation state unit 213 confirms that there is no loop exiting on any of the ports (that is, after the network device 200 transmits the loop detection packet for a predetermined number of times, none of the ports of the network device 200 receives the loop detection packet transmitted by the network device itself), the operation state unit 213 returns to the normal state from the loop state.

To summarize, the network device and the loop detection method disclosed in above embodiments of the invention have advantages exemplified below:

(1) The circuit implementing the present embodiment of the invention is not too complicated and is adaptable to all levels of network devices no matter with or without a CPU.

(2) In the present embodiment of the invention, an ID code is generated randomly when the loop detection packet is checked. Since the user does not have to manually designate the ID code, inconvenience is largely reduced for the manufacturer and the network manager.

(3) When the source address moves, the present embodiment of the invention determines whether there is any loop existing by determining whether any loop detection packet transmitted by the network device itself is received. Thus, the error in determination is reduced and the network efficiency will not be affected.

While the invention has been described by way of examples and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A network device, comprising:
an address move detection unit for detecting whether an address field of a first packet received by the network device is moved;
a loop detection packet generation unit for transmitting a loop detection packet to other network devices in response to the address move detection unit detecting that the address field of the first packet is moved;
a packet parser unit for parsing a second packet received by the network device to extract information;
a loop determination unit coupled to the packet parser unit for determining whether the second packet matches the loop detection packet based on the information so as to determine whether any loop exists involving the network device; and
an operation state unit coupled to the address move detection unit for recording an operation state of the network device, wherein the operation state comprises at least a loop state, wherein with the operation state unit in the loop state:
the loop determination unit checks whether a loop exists; and
the network device emits a warning signal if the loop exists.

2. The network device according to claim 1, wherein, the address field is a source address (SA) field.

3. The network device according to claim 1, wherein, the address move detection unit determines whether the address field is moved according to a look-up table.

4. The network device according to claim 1, wherein the operation state comprises at least a normal state, a check state and a loop state.

5. The network device according to claim 4, wherein if the address move detection unit detects that the address field is moved, the operation state unit is in the check state and the loop detection packet generation unit generates the loop detection packet.

6. The network device according to claim 4, wherein with the operation state unit in the check state:
the packet parser unit and the loop determination unit check whether any loop exists on any port of the network device;
and if the loop exists in at least one port, then the operation state unit enters the loop state from the check state.

7. The network device according to claim 6, wherein with the operation state unit in the loop state, if the network device does not receive the loop detection packet transmitted by itself, the operation state unit returns to the normal state from the loop state.

8. The network device according to claim 4, wherein with the operation state unit in the check state, after the loop detection packet generation unit transmits the loop detection packet a predetermined number of times, the operation state unit returns to the normal state from the check state if the network device does not receive the loop detection packet transmitted by itself.

9. The network device according to claim 1, further comprising: a random number generation unit for generating a random ID code.

10. The network device according to claim 9, wherein the information includes a protocol ID code field of the second packet for determining whether a format of the second packet matches a loop detection packet format; and when the format of the second packet matches the loop detection packet format, the loop determination unit compares the generated random ID code with a first ID field of the second packet to determine whether a loop occurs.

11. The network device according to claim 10, wherein the loop determination unit further compares a user-set ID code to a second ID field of the second packet to determine whether the loop occurs.

12. The network device according to claim 1, wherein if a loop occurs, the network device emits a warning signal.

13. The network device according to claim 1, wherein if a loop occurs, an instruction unit of the network device issues an interrupt signal.

14. A loop detection method applicable to a network device, comprising:
detecting, by an address move detection unit, whether an address field of a first packet received by the network device is moved;
transmitting, by a loop detection unit, a loop detection packet to other network devices in response to the address field of the first packet being detected as moved;
parsing, by a packet parser unit, a second packet received by the network device to extract information;
determining, by a loop determination unit coupled to the packet parser unit, whether the second packet matches the loop detection packet based on the extracted information so as to determine whether any loop exists involving the network device; and
recording an operation state of the network device, by an operation unit coupled to the address move detection unit, wherein the operation state comprises at least a loop state, wherein with the operation state unit in the loop state:
checking whether a loop exists; and
emitting a warning signal if the loop exists.

15. The method according to claim 14, wherein the address field is a source address (SA) field.

16. The method according to claim 14, further comprising: determining, by the address move detection unit, whether the address field is moved according to a look-up table.

17. The method according to claim 14, further comprising:
recording an operation state of the network device, by the operation unit coupled to the address move detection unit, wherein the operation state comprises at least a normal state, a check state and a loop state.

18. The method according to claim 17, wherein, when the address field is detected as moved, by the address move detection unit, the operation state is set as the check state, by the operation unit, and the loop detection packet is generated, by the loop detection packet generation unit.

19. The method according to claim 17, further comprising, when the operation state is set as the check state, by the operation unit, checking whether any loop exists on any port of the network device and setting the operation state to the loop state from the check state if a loop exists in at least one port.

20. A loop detection method applicable to a network device, comprising:
- detecting, by an address move detection unit, whether an address field of a first packet received by the network device is moved;
- transmitting, by a loop detection packet generation unit, a first loop detection packet to other network devices in response to the address field of the first packet being detected as moved;
- determining, by a loop determination unit, whether the first loop detection packet is received by the network device so as to determine whether any loop exists involving the network device; and
- in response to the network device not receiving the first loop detection packet, transmitting at least one additional loop detection packet, wherein the at least one additional loop detection packet is sent a predetermined time interval after the first loop detection packet; and
- recording an operation state of the network device, by an operation state unit coupled to the address move detection unit, wherein the operation state comprises at least a loop state, wherein with the operation state unit in the loop state:
- checking whether a loop exists; and
- emitting a warning signal if the loop exists.

21. The method according to claim 20, wherein additional loop detection packets are transmitted, by the loop detection generation unit, until a predetermined number of loop detection packets are transmitted.

\* \* \* \* \*